United States Patent [19]

Zettergren

[11] 4,360,807

[45] Nov. 23, 1982

[54] DEVICE FOR REMOTE CONTROL OF HYDRAULIC OR PNEUMATIC MACHINE TOOLS

[76] Inventor: Ted Zettergren, Kungsgarden 3402, 870 52 Nyland, Sweden

[21] Appl. No.: 193,537

[22] Filed: Oct. 3, 1980

[30] Foreign Application Priority Data

Oct. 11, 1979 [SE] Sweden ................................ 7908450

[51] Int. Cl.³ ....................... H04Q 9/00; H01H 47/32

[52] U.S. Cl. ............................ 340/825.2; 340/825.63; 361/193

[58] Field of Search ............ 340/147 R, 147 MT, 151, 340/825.2, 825.63; 318/562, 563, 565; 307/32, 38; 361/193

[56] References Cited

U.S. PATENT DOCUMENTS

| | | | |
|---|---|---|---|
| 3,943,973 | 3/1976 | Zettergren | 340/147 MT |
| 3,946,287 | 3/1976 | Hopkins | 361/193 |
| 4,065,747 | 12/1977 | Patten et al. | 340/151 |
| 4,150,416 | 4/1979 | Heppenstall et al. | 361/193 |

*Primary Examiner*—Donald J. Yusko

*Attorney, Agent, or Firm*—Silverman, Cass & Singer, Ltd.

[57] ABSTRACT

A device for remote control of hydraulic or pneumatic machine tools, comprising a selector valve for different hydraulic functions provided with a number of spring-centered slides and two electrohydraulic or -pneumatic converters connected to each slide, and comprising a control unit capable by electric impulses to transfer orders via a cable to a receiver unit capable to control the converters.

According to the invention, the control unit comprises a ring counter (B), which is controlled by an oscillator (A) and capable to emit in turn a scanning signal to each of a number of transducers (C1–C6), which are manually actuated by levers (1–6), each transducer being capable during the duration of the scanning signal to convert the direction and deflection from a centered zero position of the associated lever (1–6) into two signals, one (y) of which corresponds to said direction and one (z) to said deflection. An encoder (E) is provided to allot an address to the output signals. The receiver unit comprises a decoder (K) capable to emit a decoded signal to a signal converting circuit (L) thereby addressed where two such circuits (L) are corresponded by a transducer (C1–C6). The circuits (L) are connected each to an amplifier (M), each of which is capable to control one of said converters (N).

5 Claims, 4 Drawing Figures

DEVICE FOR REMOTE CONTROL OF HYDRAULIC OR PNEUMATIC MACHINE TOOLS

Figure 1:
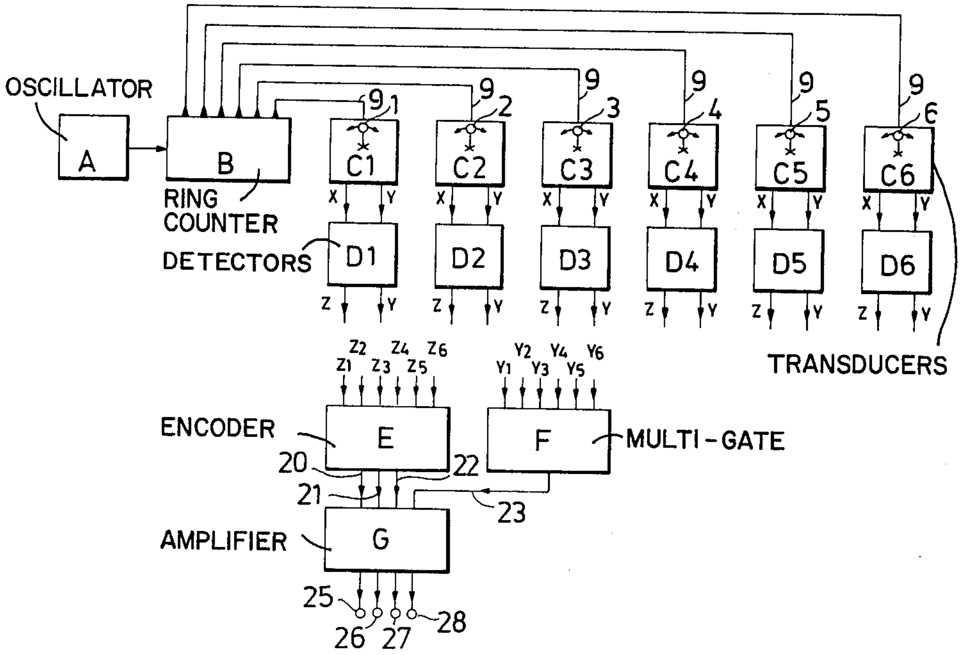

This invention relates to a device for remote control of hydraulic or pneumatic machine tools, especially load-handling machines.

It is often desired, that at such machines the control can be effected from the most suitable place, in order, for example, to eliminate the risk of accidents or to enable the driver to attach the load all by himself.

At a known type of devices of this kind, the hydraulic or pneumatic equipment is located at the machine tool and connected to a portable control unit via an electric cable. The hydraulic or pneumatic equipment comprises a plurality of proportional electrohydraulic or electropneumatic converters, which serve as adjusting means and replace or complete the normal lever control. The communication between the control unit and the converters is effected through said electric cable where the control currents are transferred each in a conductor to the converter in question.

The equipment can comprise a great number of converters, and for each converter a conductor is required. The cable, therefore, is heavy and clumsy.

At another known device a time-division multiplex system is used, which requires only three conductors for signal transfer. This system, however, has the one great disadvantage, that electric interference can give rise to self-actuation of the system, due above all to the fact that address changes for codes can occur, because an interference in a pulse train ingoing to the system is interpreted as an order to a decoder located there to shift channel. The result will be entirely uncontrolled output voltages from the control circuit.

The same applies when a component in toggle circuits, decoders or amplifiers is interfered or breaks.

These and other drawbacks are entirely eliminated by the present invention which, besides, offers very low manufacturing costs and meets very high requirements on control safety.

The present invention, thus, relates to a device for remote control of hydraulic or pneumatic machine tools, comprising a selector valve for different hydraulic functions which is provided with a number of spring-centered slides and two electrohydraulic or electropneumatic converters connected to each slide, and a control unit capable to transfer orders by electric impulses via a cable to a receiver unit, which in its turn is capable to control said converters according to said impulses. The device is characterized in that the control unit comprises a ring counter, which is controlled by an oscillator and capable to emit a scanning signal in turn to each one of a plurality of transducers actuated manually, for example by levers, each transducer being capable to convert the direction and deflection of the levers, and each transducer corresponded by two of said converters, which transducers are capable during the duration of said scanning signal to emit two output signals, one of which corresponds to said direction and the other one to said deflection, and that an encoder is provided to allot an address to the output signals, and the receiver unit comprises a decoder for emitting a decoded signal to a signal converting circuit addressed thereby, where two such circuits are corresponded by a transducer, and which circuits are connected each to an amplifier, each amplifier capable to control one of said converters.

Figure 2:
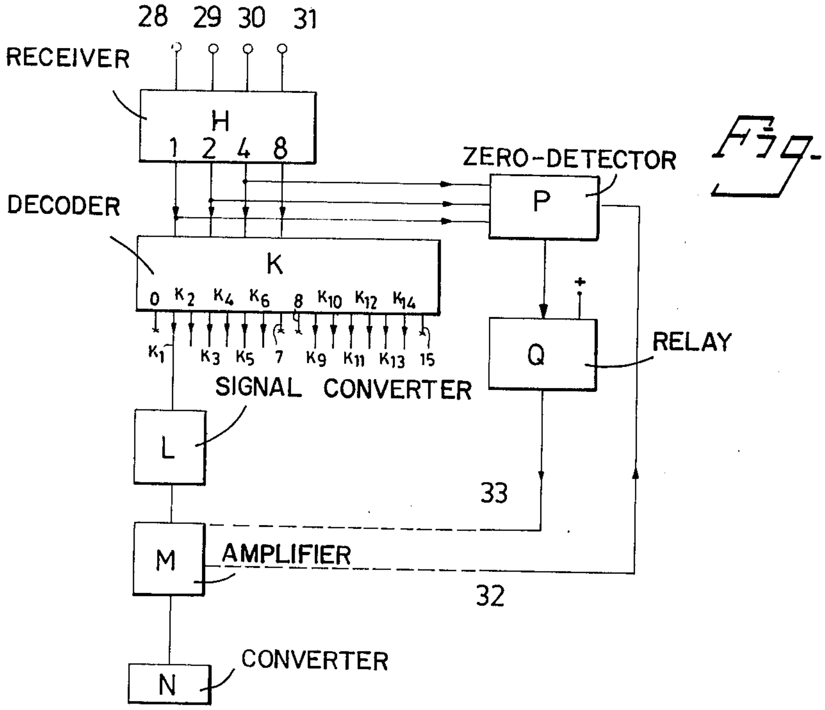
Figure 3:
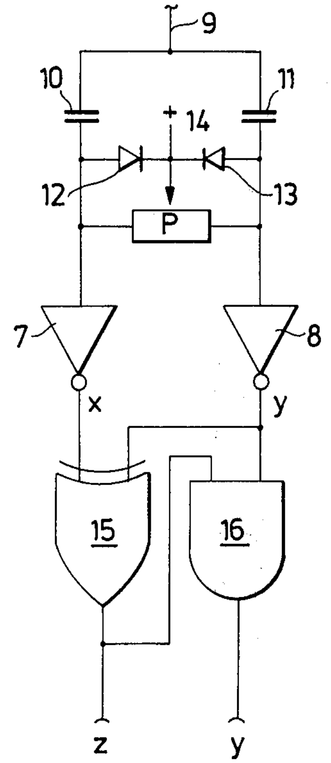
Figure 4:
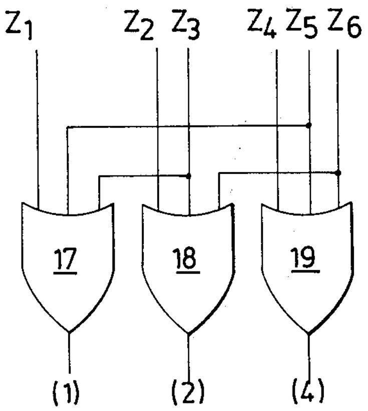

The invention is described in greater detail in the following, with reference to the accompanying drawings, in which FIG. 1 is a block diagram of a control unit, FIG. 2 is a block diagram of a receiver and signal converter unit, FIG. 3 is a detail view of the blocks C and D in FIG. 1, FIG. 4 is a detail view of block E in FIG. 1.

A device according to the invention for controlling hydraulics is described in the following by way of example in connection with a selector valve, which is provided with six conventional spring-centered slides (not shown), each with a position change proportional to the lever deflection of the control unit. It is fully understood, however, that the invention can be used for a considerably greater number of slides.

The device can be applied also to pneumatic circuits.

Each slide can be actuated from the spring-centered central position to an end position by means of electrohydraulic or electropneumatic converters N. One converter moves the slide from the central position in one direction, and the other converter moves the slide in the other direction. These converters, which in the example below are twelve in number, replace or complete the direct lever control of the selector unit.

The converters can be of a suitable known type and arranged to convert an electric pulse train from a control circuit into a mean pressure, which by balancing against the spring-centered slides of the selector valve gives rise to a slide deflection corresponding to pulse length or pulse height.

By using pulse trains, a mechanic hysteresis in the converter and valve due to inner friction in converter and selector valve is reduced in known manner.

According to the present invention, address codes from a control unit located in a place other than that of the machine in question are transferred, one at a time or in series, by means of a plurality of conductors in a control cable to a receiver unit at the machine, where each address is allotted a definite space. The address code is built up so as to agree with the standardized so-called BCD-code, so that the receiver unit instead of by the control unit can be controlled by a computer. A computer control can be switched-in simultaneously as a manual control by the control unit.

The receiver unit is arranged to decode received code and thereafter to actuate via amplifier the addressed converter which, as mentioned, is capable to actuate the selector valve.

The control unit may have any suitable design, but preferably is designed so that in this example six levers are provided, which are movable from a spring-centered central position in two directions. Each lever corresponds to a slide in the selector valve. Upon movement of a lever in one direction, a converter actuates a slide, and upon movement of the lever in the other direction, the other one of the two converters actuates said lastmentioned slide.

An essential characterizing feature of the present invention is, that for control of each slide two signals are received from the control unit, one of the signals indicating the direction of the movement of a lever, and one signal indicating the size of the lever deflection. The signals are maintained all the way to the respective amplifier for the respective converter.

At the aforementioned known time-division multiplex system such signal continuity does not exist, and the system, therefore, is sensitive to electric interferences, resulting in address changes and/or changes in size of said deflections, which in its turn gives rise to uncontrolled operation of the machine.

The said characterizing feature further implies the possibility of applying the so-called BCD-code as described below, in such a manner, that the cable between the control unit and receiver unit, in spite of the high safety, includes only four conductors for transferring signal voltage, and the cable is as easy to handle as a cable used at a time-division multiplex system.

The block diagram of the control unit shown in FIG. 1 comprises an oscillator A, which controls a ring counter B, which emits scanning pulses in turn to transducers C1–C6 of difference type. The oscillator A operates, for example, with a frequency of 300 c/s, whereby through the 6-channel ring counter 50 c/s trigger signals are obtained to each one of the difference transducers.

Each transducer is controlled by a lever 1–6. The transducers C1–C6 are capable, in the manner described below, to emit two output signals x and y, which are of equal length when the mechanic lever 1–6 is in neutral position. When the lever 1–6 is moved in one direction, the pulse length x decreases while the pulse length y increases. The relation is inverse when the lever 1–6 is moved in the opposite direction.

The difference in pulse length is proportional to the lever deflection. The difference and the direction are detected in the detector D1–D6, which are capable to emit a signal z indicating the difference in pulse length and a signal y when the pulse length y exceeds the pulse length x.

In FIG. 3 the blocks C and D in FIG. 1 are shown in detail. Each block C is identical, and each block D, too.

The block C in FIG. 1 includes two Smith-triggers 7,8. On the input 9 of block C the scanning signal from the ring counter B appears.

The scanning signal, or trigger pulse, discharges two capacitors 10,11 whereby two diodes 12,13, each in series with a capacitor, lead overvoltage to a positive potential point 14 located between the diodes 12,13. The capacitors 10,11 thereby are charged through a variable potentiometer P, after the positive scanning signal has ceased, until the two Smith-triggers 7,8, each in series with the capacitors 10,11, switch over. The pulse length of the output signal of the Smith-triggers, thus, depends on the position of the variable potentiometer P.

The potentiometer P is moved mechanically by means of said lever 1–6.

The detectors D1–D6 include an exclusive-or-gate 15 and an and-gate 16, which are connected in the way shown in FIG. 3.

Hereby, thus, from the gate 15 an output signal z is received, the pulse length of which depends on the deflection of the potentiometer P and, therewith, of the lever 1–6.

An output signal y from the gate 16 is received only when the pulse length in the signal out from the Smith-trigger 8 is greater than the pulse length in the signal out from the Smith-trigger 7.

A very high accuracy with respect to the translation of the lever deflection is obtained, in that the two identical capacitors 10,11 are mounted to the side of each other, and the same potentiometer P is used for both Smith-triggers, where both Smith-triggers are located in the same IC-capsule.

The output signals z thus received from the detectors D1–D6 are converted in an encoder E, shown in detail in FIG. 4, into a so-called BCD-code. In the example shown only three bits, viz. the bits 1,2 and 4, are used.

The output signals y received from the detectors D1–D6 are collected in a multi-gate F to serve as the fourth bit, viz. bit 8, of the BCD-code. The gate F can be a so-called 8-input-or gate.

In FIG. 4, $Z_1$–$Z_6$ designate the Z-outputs from D1–D6, and (1), (2) and (3) designate the output signals from the three gates 17,18,19 of the encoder E. In FIG. 1, $Y_1$–$Y_6$ designate the Y-outputs from D1–D6.

When priority function is desired, the encoder E can be a so-called 8 bit-priority-encoder.

The outputs 20,21,22,23 from the encoder E and multi-gate F are connected to an amplifier, so-called line-driver, the outputs 24,25,26,27 of which are connected via said cable to the inputs 28,29,30,31 of the receiver unit.

This device, thus, renders fourteen proportional addressings possible, viz. 1–7 and, when F is actuated, 9–15. When the system is expanded to five conductors in the cable, thirty addresses can be obtained, with six conductors sixtytwo addresses can be obtained, a.s.o.

The receiver unit is comprised in a line receiver H, which feeds ingoing address codes to a decoder K, which is a so-called 4/16-decoder.

In the decoder K the BCD-code is decoded in usual manner, and the decoder is capable to emit on its outputs $K_1$–$K_6$ a signal corresponding to the output signal X of the respective transducer C1–C6 when the output signal y of the respective decoder is zero, and on its outputs $K_9$–$K_{14}$ to emit a signal corresponding to the output signal X of the respective transducer C1–C6 when the output signal y of the respective decoder is different from zero.

The outputs $K_1$–$K_6$ and $K_9$–$K_{14}$ are connected each to a signal converter L and amplifier M, of which amplifiers each is connected to one of said twelve converters N. In FIG. 2, however, only one signal converter L, one amplifier M and one converter N are shown. The signal converter L, according to one embodiment, is a pulse extender. The pulses appearing on the respective output $K_1$–$K_6$, $K_9$–$K_{14}$ have a duration, which in the above example is at maximum one threehundredth part of a second and is repeated fifty times per second. According to one embodiment, the signal converter L is designed to extend the pulses so that at full deflection of a lever 1–6 a continuous signal out from the signal converter is received. The output signal from the signal converter is the input signal in the amplifier M, which in its turn controls the respective converter N so that the slide associated therewith in the selector valve is displaced.

The signal converter, instead of extending the pulses, can be arranged so as to emit a continuous signal, the voltage level of which depends on the pulse length on the output of the decoder K, or be arranged so as to convert the pulse length into a suitable pulse train.

It is, thus, possible, merely by structural detail alterations to receive from the signal converter an output signal with fixed frequency, fixed pulse ratio and variable pulse height, or an output signal with fixed frequency, fixed voltage and varying pulse ratio.

The line receiver H preferably comprises a pulse length comparison circuit known per se, which compares ingoing pulses with an intended pulse length and thereby transmits ingoing pulses onward to the decoder K only under the condition that the pulses have correct length.

When the pulses are too short, the line receiver does not emit a corresponding output signal, and when the pulses are too long, the line receiver blocks the respective output concerned. When the pulses are incorrect, the respective output is blocked, whereby an effective protection against short circuits and other faults in the control unit or cable is obtained.

In FIG. 2 also a zero-detector P is shown.

The zero-detector P is connected to all amplifiers M via conductors 32 (only one of twelve conductors is shown in FIG. 2) and is connected to outputs of the line receiver H corresponding to said deflection of the transducers. The zero-detector P is capable, after a certain predetermined time from zero-detecting, i.e. there is no signal on any of the outputs of the line receiver, to detect whether or not there is an output signal from the respective amplifier M. The said time is the maximum pulse extension time in the signal converting circuit L. When there is an output signal from an amplifier M after the predetermined time, although there is no corresponding signal on the outputs of the line receiver H, the zero-detector P is capable to break the control current to a relay Q, which thereby interrupts the voltage feed to the amplifiers M via conductors 33.

A very high degree of safety, thus, is obtained, due to the fact that the signals of each transducer are maintained all the way to the respective amplifier for controlling the respective converter, and that the line receiver is programmed not to accept pulses other than correct ones, and that the zero-detector P interrupts the voltage feed to the amplifiers M when the output signal therefrom does not agree with the output signal from the line receiver H.

The system, further, is of simple construction and uses BCD-codes, so that the system costs are low.

The system also is very insensitive to temperature variations, because the cable resistance does not affect the pulse length at all, and the transducers C1–C6 determining the difference are very stable, as mentioned above. The remaining blocks in the control unit have no influence whatsoever on pulse times due to temperature variations, at these low frequencies.

Those circuits of the ones mentioned above which are not shown in detail, are commercially available standard circuits.

The invention must not be regarded restricted to the embodiments described above, but can be varied within the scope of the attached claims.

I claim:

1. A device for remote control of hydraulic or pneumatic machine tools, comprising a selector valve for different hydraulic functions which is provided with a number of spring-centered slides and two electrohydraulic or electropneumatic converters connected to each slide, and comprising a control unit capable to transfer orders to a receiver unit, which in its turn is capable to control said converters according to said impulses, wherein the control unit comprises a ring counter (B), which is controlled by an oscillator (A) and capable to emit a scanning signal to each of a plurality of transducers (C1–C6) actuated by respective manual operating member (1–6), each transducer being capable to convert the direction and deflection of said operating members and each transducer corresponded by two of said converters (N), which transducers (C1–C6) are capable during the duration of said scanning signal to emit two output signals, one (y) of which corresponds to said direction and the other one (z) to said deflection, and that an encoder (E) is provided to assign an address to the output signals, and the receiver unit comprises a decoder (K) for emitting a decoded signal to a signal converting circuit (L) addressed thereby, where two such circuits (L) are corresponded by a transducer (C1–C6), and which circuits (L) are connected each to an amplifier (M), each amplifier capable to control one of said converters (N).

2. A device as defined in claim 1, wherein said encoder (E) is capable to assign to said output signals an address in BCD-code, where said output signals (y) concerning said direction of said operating members are collected in a multi-gate (F) to one of the bits of the BCD-code in the encoder (E), and the output signals (z) concerning said deflection of said operating members are fed in to a number of the remaining bits of the BCD-code necessary with respect to the number of transducers (C1–C6).

3. A device as defined in claim 1 or 2, wherein said receiver unit comprises a line receiver (H), which is arranged so as not to emit an output signal to said decoder (K) when a pulse ingoing from the control unit to the line receiver (H) is too short, and so as to block the respective concerned output to the decoder (K) when a pulse ingoing from the control unit is too long.

4. A device as defined in claim 1 or 2, wherein to the outputs of said line receiver (H) at least with respect to said deflection of said operating members a zero-ditector (P) is connected, which is capable, after a certain predetermined time from zero-detection, to detect whether or not there is an output signal from the respective amplifier (M), and when there is an output signal from the respective amplifier (M), although there is no corresponding signal on the outputs of the line receiver (H), to break the current supply to a relay (Q), which thereby breaks the current to said amplifier (M).

5. A device as defined in claim 3, wherein to the outputs of said line receiver (H) at least with respect to said deflection of said operating members a zero-detector (P) is connected, which is capable, after a certain predetermined time from zero-detection, to detect whether or not there is an output signal from the respective amplifier (M), and when there is an output signal from the respective amplifier (M), although there is no corresponding signal on the outputs of the line receiver (H), to break the current supply to a relay (Q), which thereby breaks the current to said amplifier (M).

* * * * *